United States Patent [19]
Clarys et al.

[11] Patent Number: 5,482,347
[45] Date of Patent: Jan. 9, 1996

[54] ROLL-UP TARP APPARATUS AND METHOD

[75] Inventors: Bernard J. Clarys; Charles M. Schmeichel, both of Jamestown, N. Dak.

[73] Assignee: Agri-Cover, Inc., Courtenay, N. Dak.

[21] Appl. No.: 203,430

[22] Filed: Mar. 1, 1994

[51] Int. Cl.$^6$ ................................................ B60P 7/04
[52] U.S. Cl. .................. 296/98; 74/546; 74/547
[58] Field of Search .............. 296/98, 100; 74/545–547; 16/115; 403/109; 160/22, 66, 68, 309, 911–913

[56] References Cited

U.S. PATENT DOCUMENTS

| | | | |
|---|---|---|---|
| Re. 31,746 | 11/1984 | Dimmer et al. | 296/98 |
| 102,642 | 5/1870 | Yenne | 160/913 X |
| 989,069 | 4/1911 | Siewert | 403/109 X |
| 1,558,114 | 10/1925 | Morrison | 74/547 |
| 1,612,446 | 12/1926 | Larson | 74/547 |
| 1,643,281 | 9/1927 | Baumann et al. | 160/309 |
| 1,941,214 | 12/1933 | Kusterle . | |
| 2,595,597 | 5/1952 | Morseth | 16/115 |
| 2,906,323 | 9/1959 | Macy | 160/68 X |
| 2,976,082 | 3/1961 | Dahlman | 296/98 |
| 3,384,413 | 5/1968 | Sargent | 296/98 |
| 3,515,428 | 6/1970 | Killion | 296/98 X |
| 3,549,198 | 12/1970 | Cappello | 296/100 |
| 3,785,694 | 1/1974 | Sargent | 296/98 |
| 3,854,770 | 12/1974 | Grise et al. | 296/98 |
| 3,975,047 | 8/1976 | McClellan | 296/98 |
| 4,030,780 | 6/1977 | Petretti | 296/100 |
| 4,050,734 | 9/1977 | Richard | 296/98 |
| 4,082,347 | 4/1978 | Petretti | 296/98 |
| 4,095,840 | 6/1978 | Woodard | 256/100 |
| 4,157,202 | 6/1979 | Bachand | 296/100 |
| 4,341,416 | 7/1982 | Richard | 296/98 |
| 4,380,350 | 4/1983 | Block | 296/98 |
| 4,484,777 | 11/1984 | Michel | 296/98 |
| 4,505,512 | 3/1985 | Schmeichel et al. | 296/98 |
| 4,516,802 | 5/1985 | Compton | 296/98 |
| 4,544,196 | 10/1985 | Schmeichel et al. | 296/26 |
| 4,659,134 | 4/1987 | Johnson | 296/98 |
| 4,691,957 | 9/1987 | Ellingson | 296/98 |
| 4,703,971 | 11/1987 | Schmeichel et al. | 296/26 |
| 4,715,089 | 12/1987 | Schema | 16/115 |
| 4,834,445 | 5/1989 | Odegaard | 296/98 |
| 4,874,196 | 10/1989 | Goldstein et al. | 296/98 |
| 4,893,864 | 1/1990 | Bailey | 296/98 |
| 4,915,439 | 4/1990 | Cramaro | 296/98 |
| 5,002,328 | 3/1991 | Michel | 296/98 |
| 5,076,338 | 12/1991 | Schmeichel et al. | 160/368.1 |
| 5,174,353 | 12/1992 | Schmeichel et al. | 160/368.1 |
| 5,179,991 | 1/1993 | Haddad, Jr. | 160/310 |
| 5,180,203 | 1/1993 | Goudy | 296/98 |
| 5,211,440 | 5/1993 | Cramaro | 296/98 |
| 5,240,303 | 8/1993 | Hageman | 296/98 |

FOREIGN PATENT DOCUMENTS

| | | | |
|---|---|---|---|
| 112325 | 2/1929 | Austria . | |
| 3340876 | 5/1985 | Germany | 160/309 |
| 100883 | 11/1962 | Norway | 160/66 |
| 2041839 | 9/1980 | United Kingdom | 296/100 |
| 1587813 | 4/1981 | United Kingdom | 403/109 |

OTHER PUBLICATIONS

*Shur–Lok Rollup Tarp*, Wahpeton Canvas Co., S. Dak., Feb., 1993 (3 pages).

*Primary Examiner*—Dennis H. Pedder
*Attorney, Agent, or Firm*—Merchant, Gould, Smith, Edell, Welter & Schmidt

[57] ABSTRACT

A roll-up assembly for covering or uncovering an open container, such as a truck, includes a roll tube transversely extending over the container, a flexible cover being rolling about the roll tube whereby one end of the flexible cover is attached to the roll tube, a cross bar transversely extending over the container whereby the other end of the flexible cover interconnects to the cross bar, a flexible arm being integral with each end of cross bar whereby the flexible arm has a pivot point mounted on the side walls of the container, a pulley being disposed on the side walls of the container, a spool being connected to each end of the roll tube, a cable whereby one end of the cable is attached to the spool and the other end of the cable is attached to tension device for adjusting tension of the cable whereby the cable is looped around the pulley whereby the tension device is disposed on the side walls of the container, and a rotating device interconnected to one end of the roll tube rotating the roll tube so that the rotating device rotates the roll tube and the spool simultaneously.

26 Claims, 11 Drawing Sheets

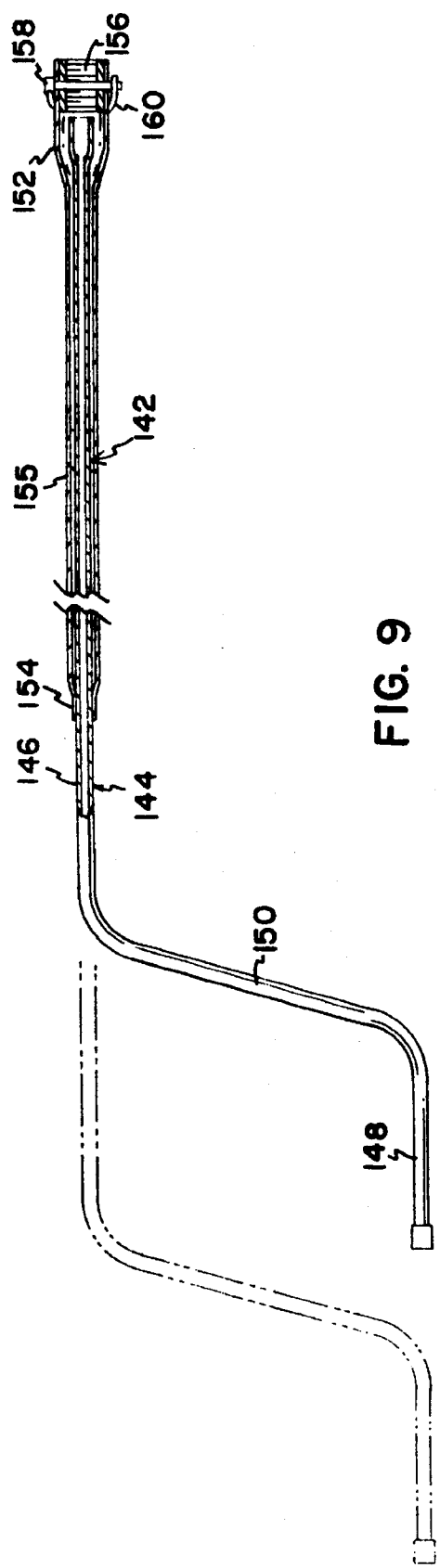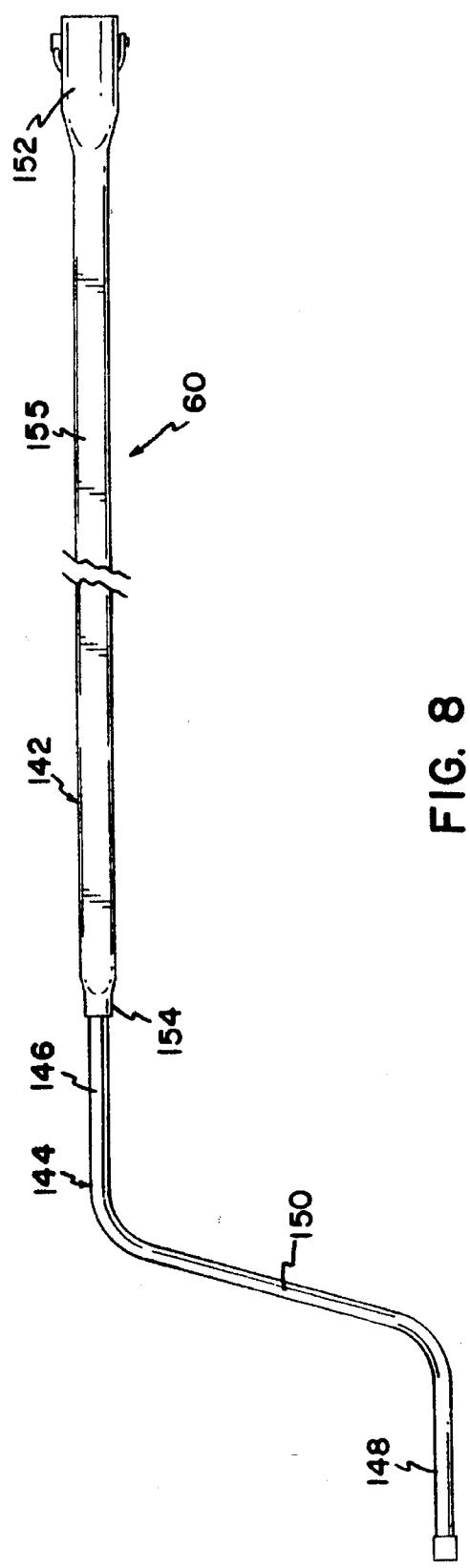
FIG. 9
FIG. 8

ROLL-UP TARP APPARATUS AND METHOD

FIELD OF THE INVENTION

The present invention relates to a roll-up flexible cover assembly for an open container, such as a truck, a trailer, etc., and more particularly relates to an easily and smoothly operable, less expensive, and more efficiently extensible and retractable roll-up flexible cover assembly.

BACKGROUND OF THE INVENTION

The use of a roll-up flexible cover assembly to cover an open container, such as a truck, trailer, semitrail, etc., is well known in the art. The roll-up flexible cover assembly is used to protect cargos and materials which are susceptible to damage from wind, snow, rain, fumes, etc. during storage and transit. The roll-up flexible cover assembly is also used to prevent the discrete material in the container from flying onto the road or other vehicles, which particularly happens in transporting sand, dirt, rock, rubbish, and wood chips, and other gravel materials. Many state laws and regulations specifically require that the open container be covered for the purpose of safety.

The roll-up flexible cover assembly generally has two types, the hand cranking assembly and the motorized assembly. One concern in the existing hand cranking assembly is that it is difficult to operate. Most of the hand cranking assemblies rely on springs to close and open the open container, and the spring tension is transmitted back to the operator through a crank handle, which creates hardship on the operator. One alternative way to overcome this difficulty is to use the motorized assembly. However, the motorized assembly is usually expensive and bulky.

Another prime concern is that the well-known roll-up flexible cover assembly has difficulty in maintaining uniform tension on the flexible cover which often causes the cover being displaced or jammed. In addition, the inconstant tension on the flexible cover causes the cover to billow and flap especially in transit. The billowing and flapping not only causes the damage to the flexible cover, but also violates the laws and regulations because some materials may fall from the open container.

Another concern of using the hand cranking assembly is the storage and operation of the crank handle. When the truck or other vehicle is moving at an especially high speed, the crank handle should be stored in a safe way. When the crank handle is operated to open or close the open container, the crank handle should be easily operated. Usually, it is easier to operate the crank handle when the operator stands away from the truck. Thus, the crank handle is often made long enough for the operator to stand away from the truck and also to be able to reach it. However, the long crank handle causes storage problems because it is too long. In order not to hit the ground or not to be disposed at the lower extremities of the truck, the crank handle is usually cross-stored on the side or back of the truck. The cross-storage of the crank handle on the side or back of the truck may create a lot of tension on a roll tube or the connection member between the roll tube and the crank handle because the cross-stored crank handle has to be turned at a certain angle. In addition, the cross-storage of the crank handle may be interference with other parts of the roll-up flexible cover assembly.

U.S. Pat. No. 3,854,770 issued to Grise et al. discloses a truck cover assembly including two tapered spools, two parallel pivot side members, and two pulleys. In Grise, a cable has one end attached to and wound on one of the tapered spools and the other end attached to one of the pulleys so that when the spool and the roll tube are rotated, the spool end of the cable is wound onto the spool, and the pulley end of the cable pulls the side member about its pivot point. The pivot point has to be high enough so that the cable can pull the side member. In addition to the other problems that Grise has, such as easily storing and operating the crank handle, Grise does not solve the inconstant tension problem.

The present invention overcomes the above discussed disadvantages associated with the roll-up flexible cover assembly used in the open container.

SUMMARY OF THE INVENTION

The present invention relates to a roll-up flexible cover assembly for an open container, such as a truck, a trailer, etc., and more particularly relates to an easily and smoothly operable, less expensive, and more efficiently extensible and retractable roll-up flexible cover assembly.

In one embodiment in accordance with the principles of the present invention, a roll-up flexible cover assembly for covering or uncovering an open container includes a flexible cover being rolled on/off a roll tube. One end of the flexible cover is attached to the roll tube, and the other end of the cover is interconnected with a cross bar which transversely extends over the container, parallel to the roll tube. The assembly further includes two flexible arms each of which is integral with each end of a cross bar. The flexible arm has a pivot point on the lower side of the side walls of the container. The flexible arms are mounted on the side walls at the pivot point.

Yet in one embodiment, a pulley is disposed at a lower end of the flexible arm, which is away from the cross bar. The pivot point is disposed closer to the pulley than to the other end which is attached to the cross bar.

Still in one embodiment, a spool is connected to each end of the roll tube, and a cable is attached and wound onto the spool at one end and is attached to the tension means at the other end. The tension means is mounted on the side walls of the container. The tension means is positioned intermediate of the spool and the pulley so that the cable starts from the spool to the pulley proximate the bottom of the side walls and then to the tension means at the middle of the side walls. The tension means is used to adjust the tension of the cable. In addition, the cable is looped around the pulley so that the pulling force on the cable is reduced to half compared to the pulling force which directly pulls the cable.

In one embodiment, the spool is a straight spool.

In one embodiment, the tension means includes a rachet member. The rachet member is connected to one end of the cable.

In one embodiment, the rotating means for rotating the roll tube is interconnected with one end of the roll tube.

Still in one embodiment, the adjusting means for adjusting flexibility of the flexible arm is disposed at the pulley end of the flexible arm.

In one embodiment, the transferring means for transferring the rotating torque from the rotating means to the roll tube is interconnected between the roll tube and the rotating means.

Yet in one embodiment, the rotating means is a crank handle. The crank handle comprises telescopically disposed longitudinal tube and rotatable tube, means for rotatably adjusting the rotatable tube relative to the longitudinal tube, and means for locking the rotatable tube relative to the longitudinal tube so that the rotatable tube rotates with the longitudinal tube.

In one embodiment, the adjusting means of the crank handle includes an enlarged portion of the rotatable tube which is disposed in an enlarged end portion of the longitudinal tube. The enlarged portion of the rotatable tube is freely rotated within the enlarged end portion of the longitudinal tube.

In one embodiment, the longitudinal tube includes a reduced diameter end portion away from the enlarged end portion. The reduced diameter end portion has a smaller diameter than the enlarged portion of the rotatable tube so that the rotatable tube extends to a longest length without falling out of the longitudinal tube.

In one embodiment, the locking means includes a multi-sided portion of the rotatable tube which is disposed within a multi-sided body portion of the longitudinal tube so that the rotatable tube is rotatably locked relative to the longitudinal tube.

In one embodiment, the multi-sided portion of the rotatable tube and the multi-sided body portion of the longitudinal tube are four-sided so that the rotatable tube is quarterly-turned with respect to the longitudinal tube.

In another embodiment, the rotating means is an electric motor. The electric motor which is interconnected with the roll tube rotates the roll tube.

Yet another embodiment, the longitudinal tube includes a stopping portion which stops the rotatable tube from falling from the longitudinal tube.

Still in another embodiment, the pulley is mounted on the side walls of the container.

In another embodiment, the tension means is mounted on the flexible arm.

These and various other advantages and features of novelty which characterize the invention are pointed out with particularity in the claims annexed hereto and forming a part hereof. However, for a better understanding of the invention, its advantages, and objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters generally indicate corresponding parts throughout the several views.

FIG. 8 is an elevated side view of a crank handle having a shortened longitudinal tube for the purposes of illustration (it is also shortened in the following drawings).

FIG. 9 is a longitudinal cross-sectional view of the crank handle in an adjusting position (solid lines) and at a working or storing position (phantom lines).

DETAILED DESCRIPTION OF THE PREFERRED EMBODIMENT

Figure 1:
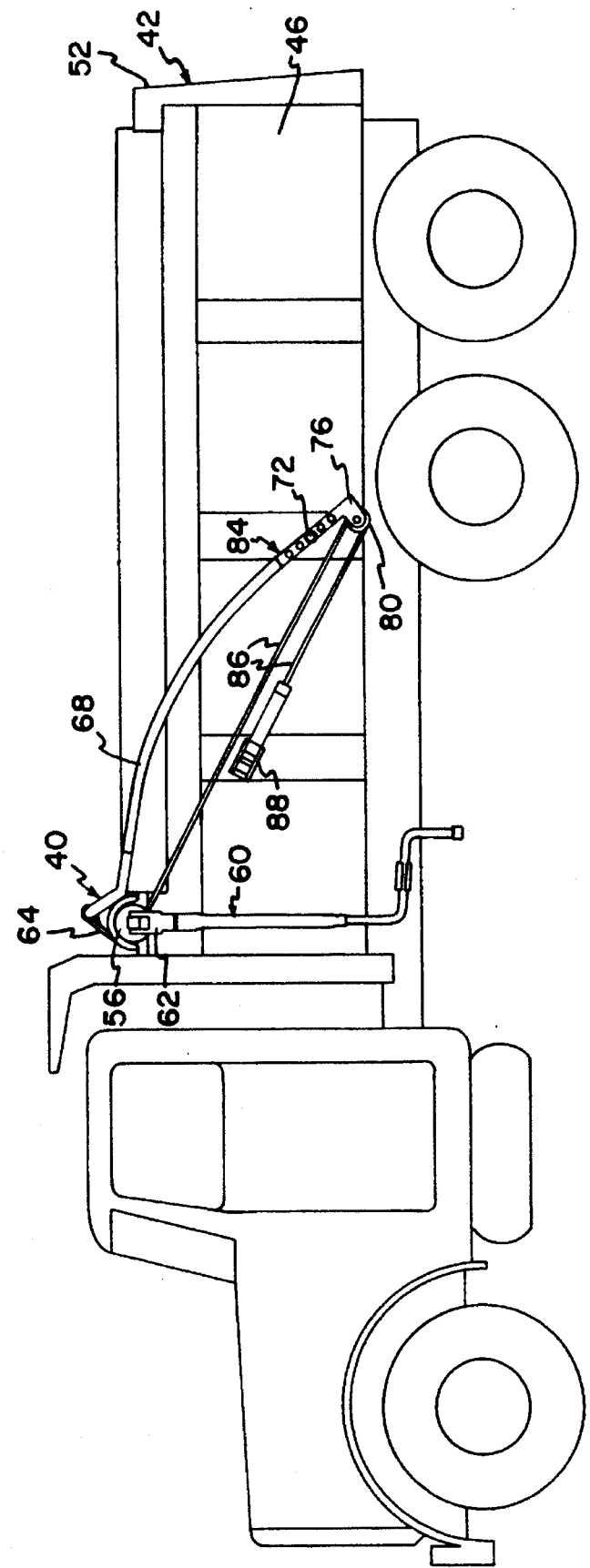
FIG. 1 is an elevated side view of an embodiment of a roll-up flexible cover assembly in accordance with the principles of the present invention being used on an open box truck with the open box uncovered.
Figure 2:
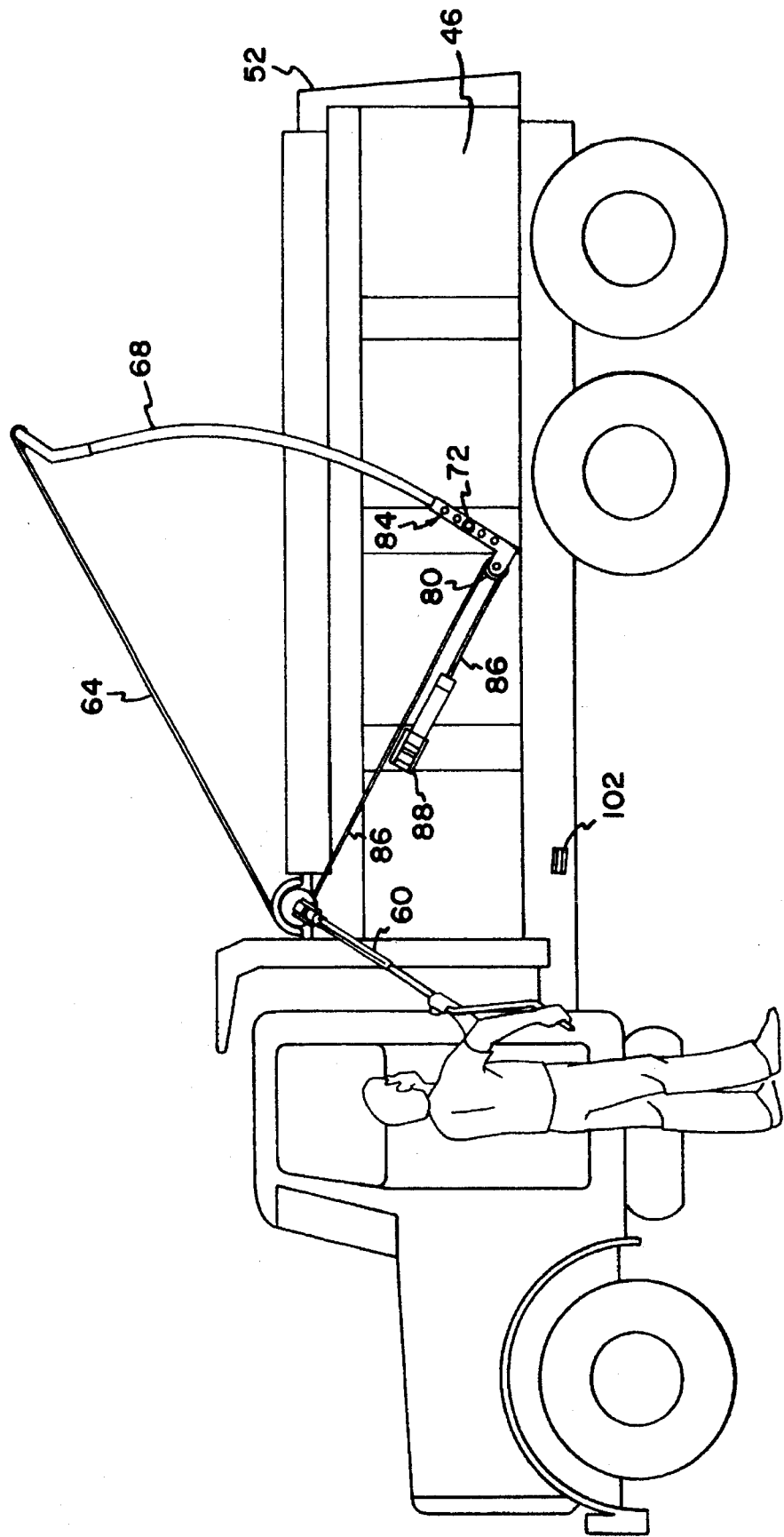
FIG. 2 is an elevated side view of the roll-up flexible cover assembly being operated to cover or uncover the open box of the truck.
Figure 3:
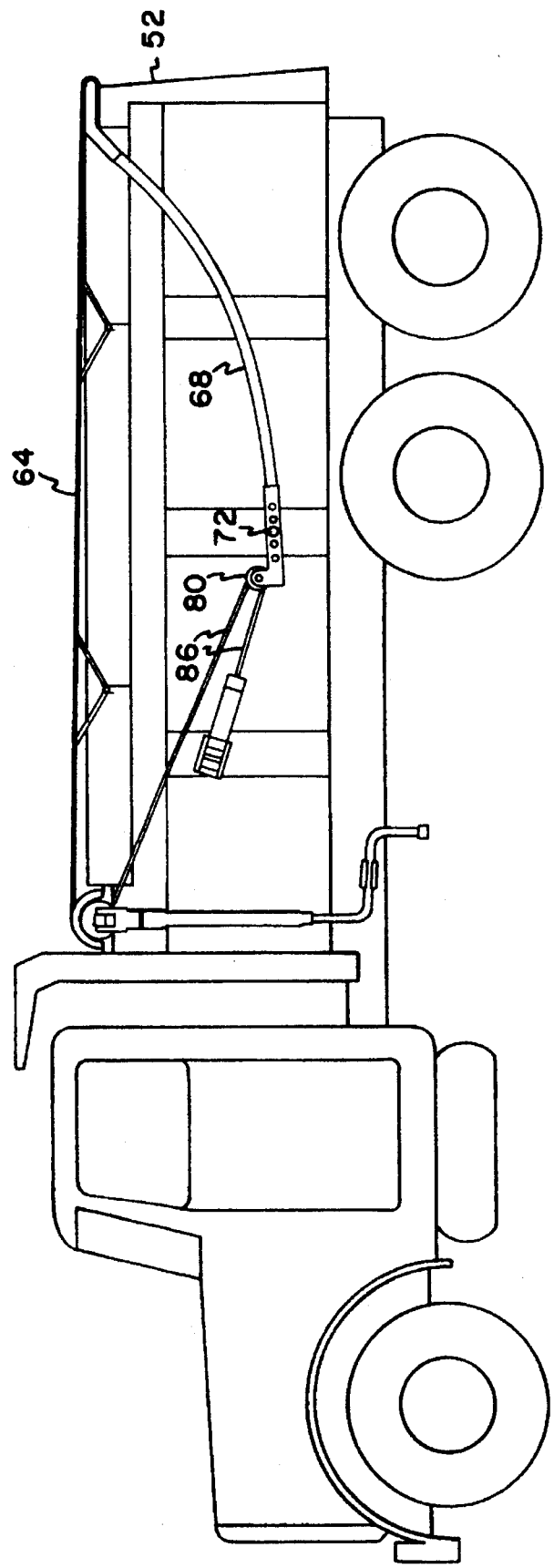
FIG. 3 is an elevated side view of the roll-up flexible cover assembly covering the open box of the truck.
Figure 4:
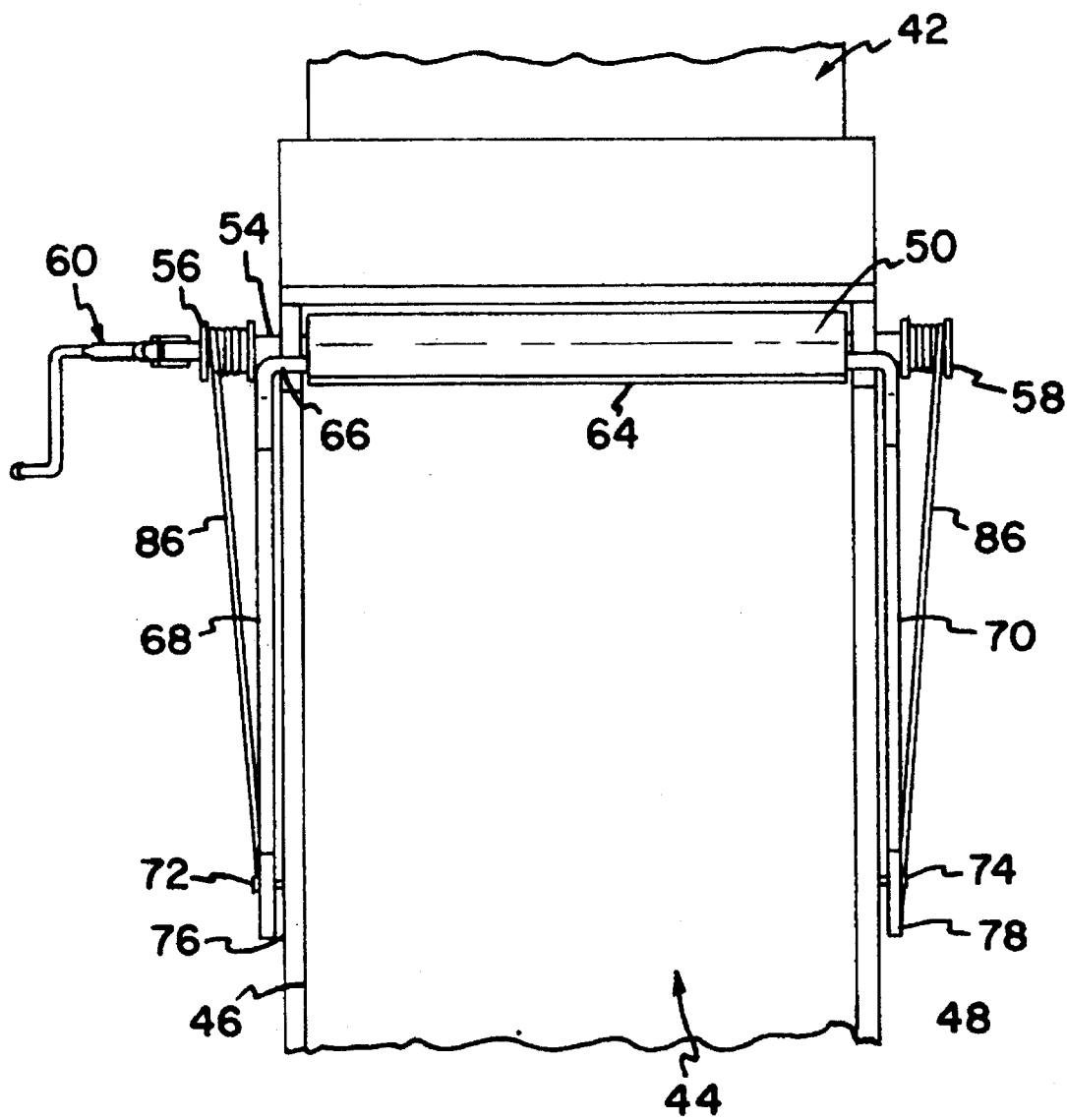
FIG. 4 is a top plane view of the truck with the roll-up flexible cover assembly with the open box uncovered.

In FIGS. 1–4, there is shown a roll-up flexible cover assembly which is designated as reference number 40. The assembly 40 is mounted on an open container, such as truck 42 having an open box 44. The open container can also be a trailer, semi-trailer, etc. The open box 44 has two side walls 46,48, front end wall 50, and back end wall 52.

The assembly 40 includes a roll tube 54 transversely extending adjacent to the front end of the open box 44. Two distal ends of the roll tube 54 are mounted on the side walls 46,48. Two spools 56,58 are interconnected with the two ends of the roll tube 54. The spool 56 is also connected to a crank handle 60 through a connecting member 62. The connecting member 62 can be a U-joint, or a flexible hose, etc., so that the rotating torque of the crank handle 60 is transferred to the roll tube 54 and the spools 56,58 through the connecting member 62. The crank handle 60 can also be replaced by an electric motor (not shown) which interconnects with the roll tube 54 and rotates the roll tube 54 and the spools 56,58.

A flexible cover 64 has one side attached to the roll tube 54 and the other side attached to a cross bar 66. When the flexible cover 64 is rolled on the roll tube 54, the open box 44 is uncovered. When the flexible cover 64 is rolled off the roll tube 54, the open box 44 is covered by the flexible cover 64. The flexible cover 64 can be canvas, tarpaulin, or other types of materials.

Two flexible arms 68,70 are integral with two ends of the cross bar 66. Each of the flexible arms 68,70 respectively has pivot points 72,74 mounted on the side walls 46,48. The pivot points 72,74 are closer to the ends 76,78 than the cross bar ends. Pulleys 80,82 are disposed at the ends 76,78 (82, which is not shown, is symmetric to the pulley 80 at the end 78 of the flexible member 70). The flexible arms 68,70 are bent upward into a convex shape, and have one proximate end which is connected to the cross bar 66 being bent downward into a concave shape, and have ends 76,78 being bent downward into a substantially vertical angle to receive pulleys 80,82.

The arms 68,70 each have adjusting means 84 for adjusting the length of the arms 68,70 so that the flexibility of the arms 68,70 can be adjusted accordingly. The pivot points 72,74 are disposed on the adjusting means 84.

A cable 86 has one end being attached to the spool 56 and the other end being attached to a tension means 88. In one embodiment, the tension means 88 is a ratchet member which is connected to the cable 86. The tension means 88 is mounted on the side wall 46, intermediate of the spool 56 and the pulley 80, for adjusting the tension of the cable 86.

The cable 86 is also looped around the pulley 80. When the crank handle 60 is rotated clockwise, the cable 86 is wound onto the spool 56. When the crank handle 60 is rotated counter-clockwise, the cable 86 is wound off the spool 56. Since the spool 56 and the roll tube 54 are connected to the crank handle 60, the spool 56 and the roll tube 54 rotate in one direction. Accordingly, when the cable 86 is wound onto the spool 56, the end 76 of the flexible arm 68 is pulled toward the front wall 50, while at the same time the flexible arms 68,70 unwind the flexible cover 64 from the roll tube 54. Since the roll tube 54 is rotated at the same time, the flexible arms 68,70 do not need to bend more to pull the flexible cover 64 out of the roll tube 54 so that the operator can easily rotate the crank handle 60 without feeling any tension transmitted from the flexible cover 64 back to the operator. It is appreciated that the spool 58, the flexible arm 70, the pulley 82, and another similar cable 86 and tension means 88 on the side wall 48 are operated symmetrically to that of the side wall 46 as discussed. The spools 56,58 may be tapered. In the preferred embodiment, the spools 56,58 are not tapered. When the crank handle 60 rotates both the spools 56,58 and the roll tube 54, the roll tube 54 either winds or unwinds the flexible cover 64 so that the diameter of the roll tube with the flexible cover is not constant, and it usually creates inconstant tension on the flexible cover 64. In the preferred embodiment, the flexible arms 68,70 help keep constant tension on the flexible cover 64 through their flexibility. Since the flexible arms 68,70 are biased upward, the flexible cover 64 is tightened all the time. When the crank handle 60 is turned counter-clockwise, the flexible cover 64 opens. While doing so, the flexible cover 64 is wound onto the roll tube 54. At the same time, the cables 86 are being unwound from the spools 56,58 at a near equal ratio. The flexible arms 68,70 not only keep constant tension on the flexible cover 64, they also compensate for the slight diameter or timing difference in this ratio. When the crank handle 60 is turned clockwise, the flexible cover 64 closes. This time the flexible cover 64 is unwound from the roll tube 54 at the similar rate to that of the cable 86 being wound onto the cable spools 56,58. The tension means 88 and the pulleys 80,82 cooperate with the flexible arms 68,70 so as to easily open and close the open box 44.

Figure 5:
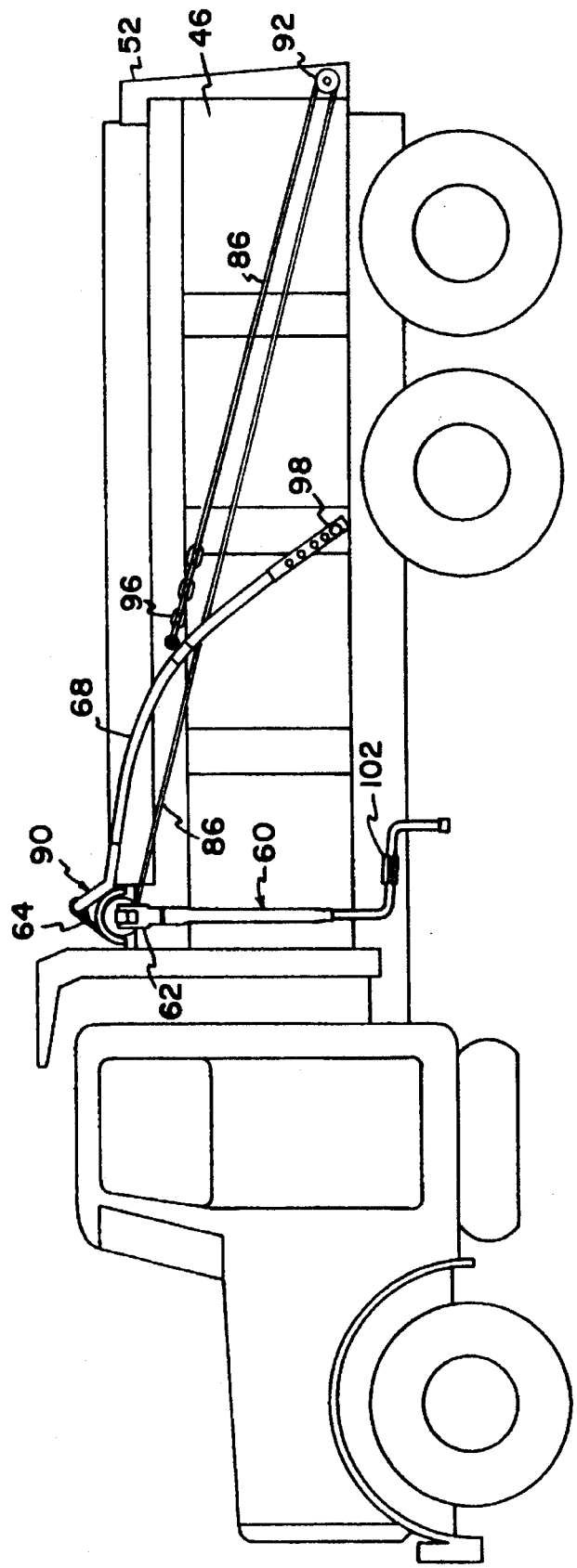
FIG. 5 is an elevated side view of a second embodiment of a roll-up flexible assembly in accordance with the principles of the present invention being used on an open box truck with an open box uncovered.
Figure 6:
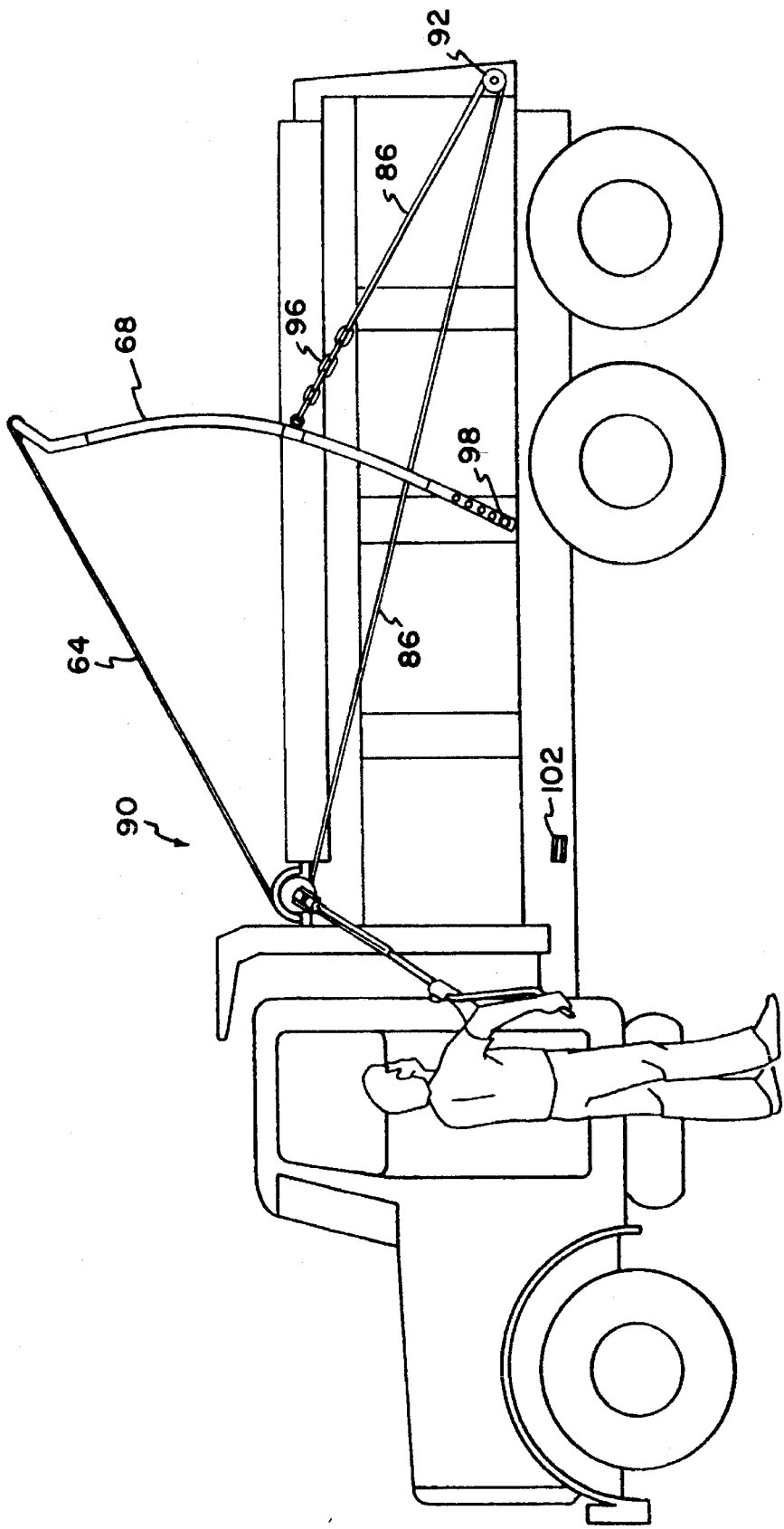
FIG. 6 is an elevated side view of the roll-up flexible cover assembly being operated to cover or uncover the open box of the truck.
Figure 7:
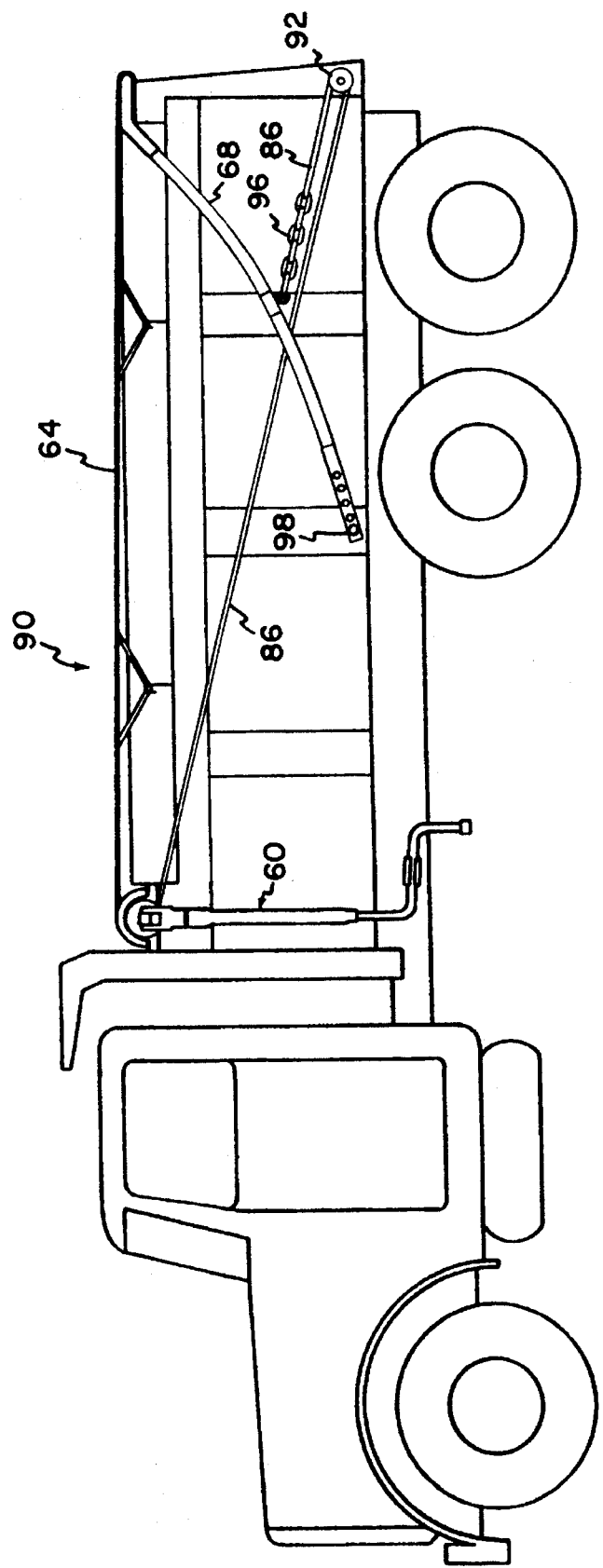
FIG. 7 is an elevated side view of the roll-up flexible cover assembly covering the open box of the truck.

In FIGS. 5–7, there is shown a second embodiment of the roll-up flexible cover assembly which is designated as numeral reference 90. The roll-up flexible cover assembly 90 has the similar structure and function as the first embodiment of the roll-up flexible cover assembly 40 except that the pulleys 92,94 (94 which is on the side wall 48 is not shown) in the second assembly 90 are mounted on the side walls 46,48 proximate to the back end of the truck 42. The cables 86 are attached and wound around the spools 56,58 at one end and are attached to a tension means 96 at the other end. The tension means 96 is not a ratchet device as in the tension means 88 of the first embodiment. The tension means 96 includes an adjustable chain wherein one end of the chain is attached to the cable 86, and the other end of the chain is mounted onto the proximate middle portion of the flexible arms 68,70. The length of the chain can be adjusted to tighten the cable 86. In addition, the pivot points 98,100 (100 which is on the side wall 48 is not shown) are disposed proximate to the end of the flexible arms 68,70.

In FIG. 8, there is shown that the crank handle 60 includes a longitudinal tube 142 and a rotating tube 144. The rotating tube 144 has a longitudinal portion 146 partially, telescopically, disposed in the longitudinal tube 142. A handle portion 148 which is substantially parallel to an axis of the longitudinal tube 142 rotates the rotating tube 144 about the axis. A middle portion 150 is vertically integral between the handle portion 148 and the longitudinal portion 146.

The longitudinal tube 142 has an enlarged end portion 152 and a shrunk end portion 154. The enlarged and shrunk end portions 152,154 have a circular cross-section. A body portion 155 of the longitudinal tube 142 has a rectangular cross-section. It is appreciated that any other shapes can be used as well. The enlarged end portion 152 is connected to the roll tube 54 of the roll-up flexible cover assembly 40 or 90.

As shown in FIG. 9, a fitting 156, a mounting pin 158, and a mounting spring 160 are disposed proximate at the enlarged end portion 152. The fitting 156, the mounting pin 158, and the mounting spring 160 are used to prevent the rotating tube 144 from falling out of the enlarged end portion 152 of the longitudinal tube 142, and to connect the roll tube 54.

FIG. 9 also shows that the rotating tube 144 has an enlarged portion 162. The enlarged portion 162 is reciprocated inside the longitudinal tube between the enlarged end portion 152 and the shrunk end portion 154. The enlarged portion 162 has a rectangular cross-section which is similar but smaller than that of the body portion 155 of the longitudinal tube 142. Accordingly, when the enlarged portion 162 is disposed in any position between two end portions 152,154, the rotating tube 144 is transversely locked in the longitudinal tube 142. Thus, the turning of the rotating tube 144 turns the longitudinal tube 142 accordingly. In addition, the rest of the portion of the rotating tube 144 has a circular cross-section. Thus, when the enlarged portion 162 is disposed in the enlarged end portion 152, there is no transverse restriction between the longitudinal tube 142 and the rotating tube 144 such that the rotating tube 144 can be freely adjusted to any direction with respect to the longitudinal tube. When the enlarged portion 162 is moved toward the shrunk end portion 154, since the diameter of the shrunk end portion 154 is smaller than the length of one side of the rectangular cross-section of the enlarged portion 162, the shrunk end portion 154 stops the further movement of the enlarged portion 162. Thus, it prevents the rotating tube 144 from falling out of the longitudinal tube 142. In addition, the rotating tube 142 is extended to the longest working position so that the operator can stand away from the truck 168 and easily operate the crank handle 60. The phantom lines in FIG. 9 show one of the working positions whereby the enlarged portion 162 is disposed in the body portion 155 of the longitudinal tube 142.

Figure 10:
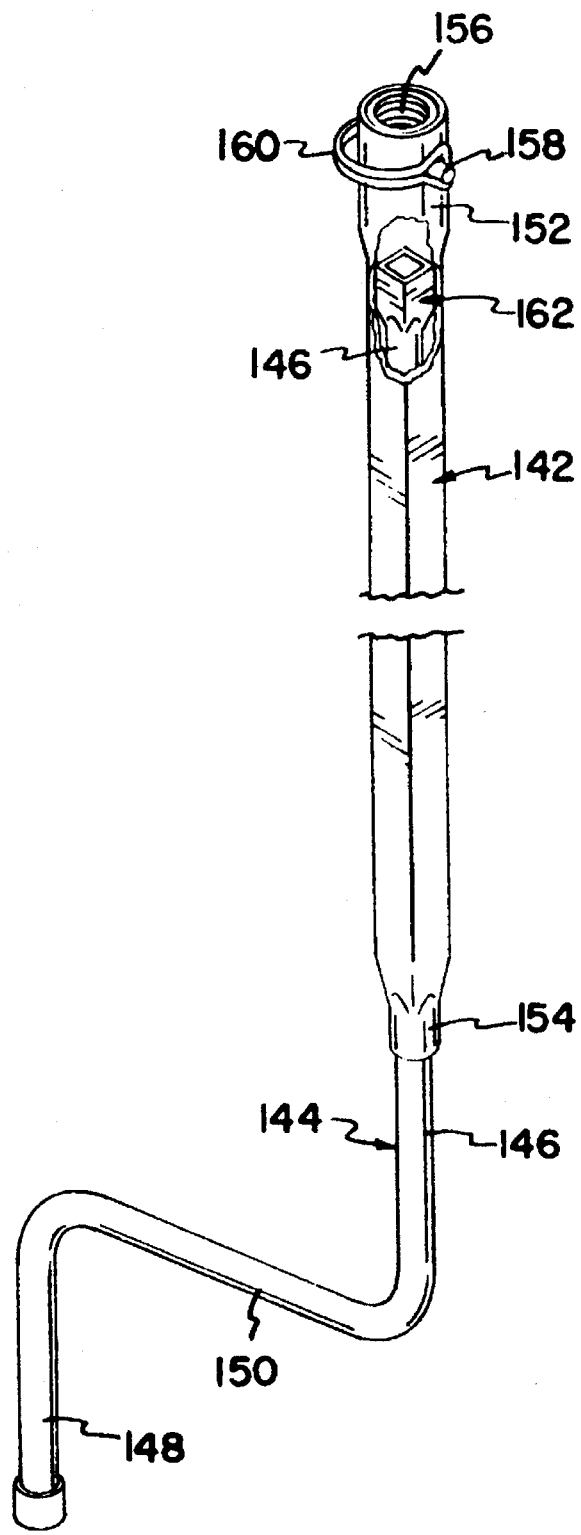
FIG. 10 is a perspective view of the crank handle at the working or storing position.

FIG. 10 shows a perspective view of the enlarged portion 162 being disposed beyond the enlarged end portion 152. It is appreciated that the shapes of the enlarged portion 162 and the rest of the rotating tube 144 can be in any other shapes as long as the rotating tube 144 is locked in working positions and is released in the adjusting position.

Figure 11:
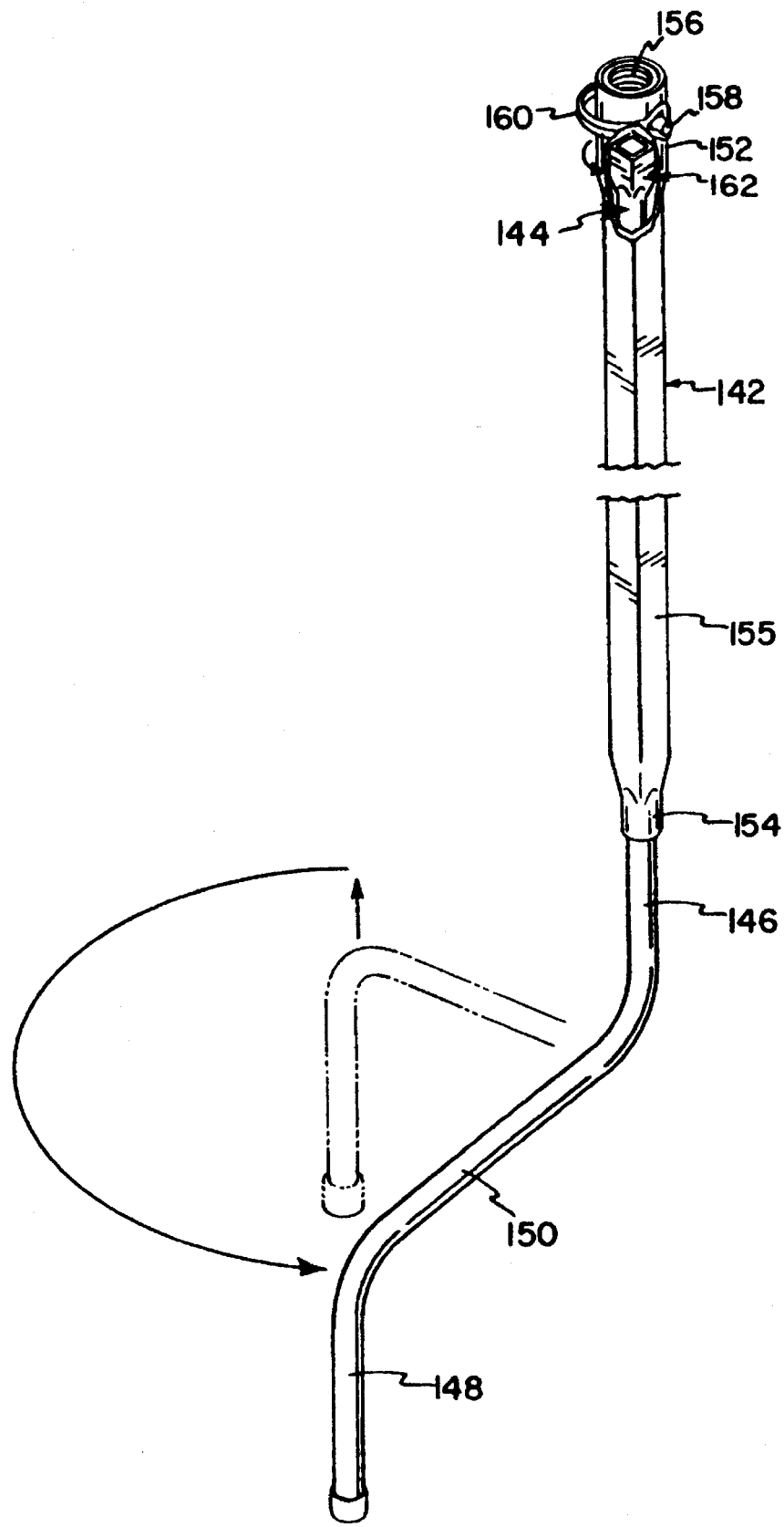
FIG. 11 is a perspective view of the crank handle at the adjusting position where the crank handle is adjusted by a quarter turn.

FIG. 11 shows a perspective view of the crank handle 60 being turned from a working position. The vertical arrow shows that the rotating tube 144 is moved upward from a working position to the adjusting position whereby the enlarged portion 162 is disposed in the enlarged end portion 152. The transverse arrow shows a turning direction of the rotating tube 144. Since the rotating tube 144 and the longitudinal tube 142 are disengaged therebetween, the longitudinal tube 142 does not rotate with the rotating tube 144. Once the rotating tube 144 is placed in a desired position, the rotating tube 144 is moved downward from the adjusting position to a new working position so that the enlarged portion 162 is disposed in the body portion 155 of the longitudinal tube 142. Thus, the longitudinal tube 142 is rotated with the rotating tube 144. Since the enlarged portion 162 and the body portion 155 have rectangular cross-sections, the new position is in one of the quarterly-turned positions.

Figure 12:
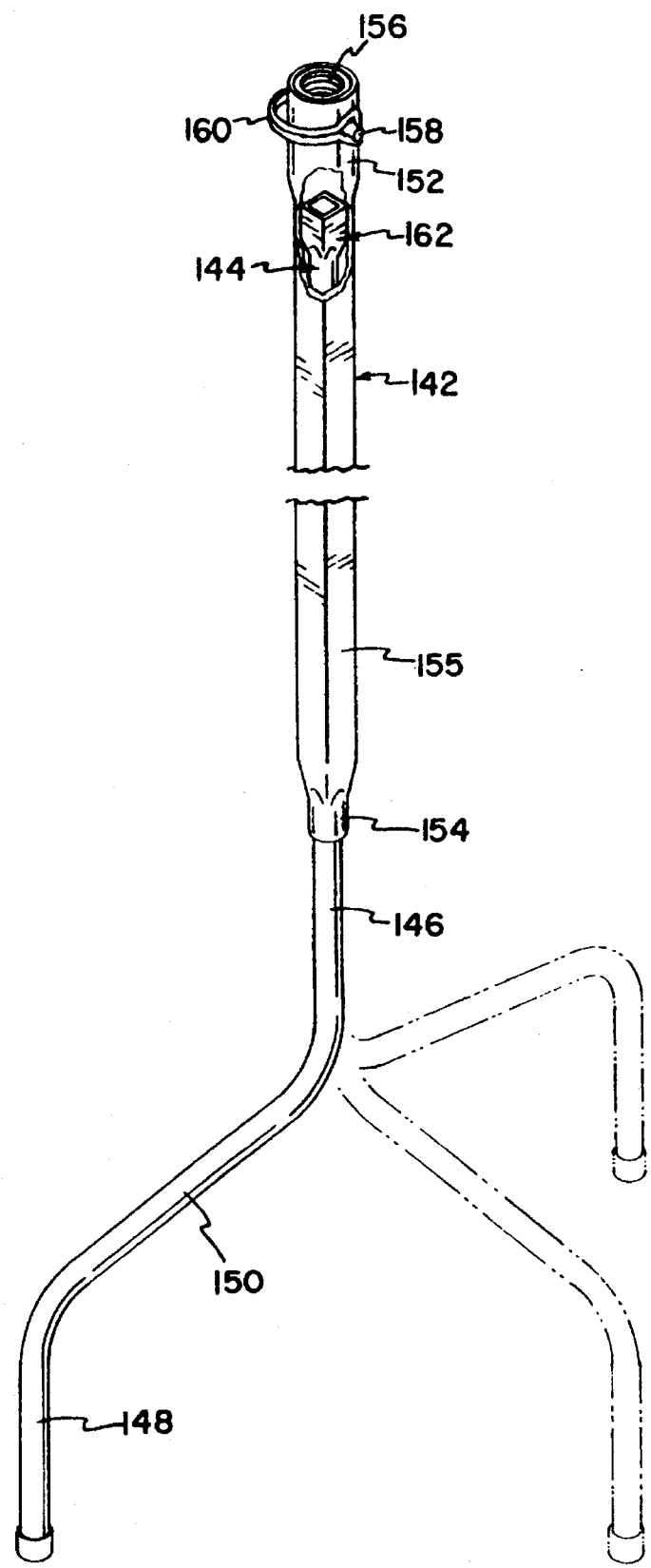
FIG. 12 is a perspective view of the crank handle at the working or storing position where the crank handle is adjustable to other quarterly-turned working or storing positions.

In FIG. 12, there is shown the rotating tube 144 being disposed in different working positions. As mentioned above, the enlarged portion 162 and the body portion 155 are in a four-sided rectangular shape in the preferred embodiment, the rotating tube 144 is turned by a scale of 90° (or called a quarter turn). It is appreciated that the enlarged portion 162 and the body portion 155 can be in any other multi-sided shape so that the number of the working positions can be varied accordingly.

To cover the roll-up flexible cover assembly 40 or 90 on the open box 44, the operator takes out the crank handle 60 from a retainer 102 on the side wall 46 of the truck 42 and adjusts a length of the crank handle 60 if desirable so that the operator can extend the crank handle 60 and rotate it while he/she stands away from the truck 42. Then the operator rotates the crank handle 60 clockwise so that the flexible cover 64 is wound off the roll tube 54, and the cable 86 is wounded onto the spools 56,58 so as to pull the bottom of the flexible arms 68,70 toward the front end of the truck 42. Then, the operator adjusts a rotating turn of the crank handle 60 if necessary so as to fit the crank handle 60 into the retainer 102. Finally, the operator puts the crank handle 60 back in the retainer 102.. To uncover the roll-up flexible cover assembly 40 or 90 from the open box 44, the operator takes out the crank handle 60 from the retainer 102 on the side wall 46 of the truck 42 and adjusts a length of the crank handle 60 if desirable so that the operator can extend the crank handle 60 and rotate it while he/she stands away from the truck 42. Then the operator rotates the crank handle 60 counter-clockwise so that the flexible cover 64 is wound on the roll tube 54, and the cable 86 is wounded off the spools 56,58 so as to pull the bottom of the flexible arms 68,70 toward the back end of the truck 42. Then, the operator adjusts a rotating turn of the crank handle 60 if necessary so as to fit the crank handle 60 into the retainer 102. Finally, the operator puts the crank handle 60 back in the retainer 102. If the crank handle is four-sided, the rotating turn is a quarter turn. If the crank handle is multi-sided, the rotating turn could be any desired one.

It will be appreciated that alternate embodiments in keeping with the principles of the present invention might be utilized. It is to be understood, however, that even though numerous characteristics and advantages of the invention would be set, together with details of the structure and function of the invention, the disclosure is illustrative only, and changes may be made in detail, especially in matters of shape, size and arrangement of parts, within the principle of the invention, to the full extent indicated by the broad general meaning of the terms in which the appended claims are expressed.

What is claimed is:

1. A roll-up flexible cover assembly for covering or uncovering an open container, comprising:

a roll tube transversely extending over the container adjacent a first end of the container, the roll tube being mounted on side walls of the container;

a flexible cover being rolled about the roll tube, one end of the flexible cover being attached to the roll tube;

a cross bar transversely extending over the container, the other end of the flexible cover interconnecting to the cross bar;

a flexible arm being mounted on each end of cross bar, the flexible arms each having a pivot point mounted on the side walls of the container, each of the flexible arms being biasedly bent to keep constant tension on the flexible cover;

a pulley being disposed proximate an end of each flexible arm;

a spool being connected to each end of the roll tube;

pair of cables, one end of each of the cables being attached to each of the spools, the other end of each of the cables being attached to tension means for adjusting tension of the cables, each of the cables being looped around each of the pulleys;

each of the tension means being mounted on one of the side walls of the container; and rotating means, being interconnected to one end of the roll tube, for rotating the roll tube so that the rotating means rotates the roll tube and the spool simultaneously.

2. A roll-up flexible cover assembly according to claim 1, further comprising means for adjusting flexibility of the flexible arm, the adjusting means being disposed on the flexible arm.

3. A roll-up flexible cover assembly according to claim 1, wherein the spool is untapered.

4. A roll-up flexible cover assembly according to claim 1, wherein each of the flexible arms is biased to compensate for slight diameter difference between the roll tube having the flexible cover rolled around and each spool having each cable wound around, so that each cable winds/unwinds onto/from each spool in substantially same ratio as the flexible cover rolls around the roll tube.

5. A roll-up flexible cover assembly according to claim 1, wherein the tension means includes an adjustable member connecting to the cable, the tension means is attached to the flexible arms.

6. A roll-up flexible cover assembly according to claim 1, further comprising means for transferring rotation from the rotating means to the roll tube.

7. A roll-up flexible cover assembly according to claim 1, wherein the pulley is attached to one end of the flexible arm which is away from the cross bar, the pivot point being disposed closer to the pulley than to the end attached to the cross bar.

8. A roll-up flexible cover assembly according to claim 1, wherein the rotating means is a crank handle, the crank handle comprises:

a multi-sided longitudinal tube having an enlarged portion proximate at a first end;

a tubular rotatable tube having a longitudinal portion and a handle portion offset from a longitudinal axis of the longitudinal portion;

the longitudinal portion being telescopically disposed in the longitudinal tube and movable between the first end and a second end of the multi-sided longitudinal tube; and the tubular rotatable tube having a multi-sided enlarged portion at a first end corresponding to the multi-sided longitudinal tube, so that only when the multi-sided enlarged portion of the tubular rotatable tube is disposed in the enlarged portion of the multi-sided longitudinal tube, the tubular rotatable tube can be freely rotated in the multi-sided longitudinal tube, and when the multi-sided enlarged portion of the tubular rotatable tube is retracted from the enlarged portion of the multi-sided longitudinal tube, the multi-sided enlarged portion engages with multi sides of the longitudinal tube whereby the two tubes are transversely engaged with each other so that the two tubes are rotated together.

9. A roll-up flexible cover assembly according to claim 1, wherein the rotating means is a crank handle, the crank handle comprises:

a longitudinal tube;

a rotatable tube having a longitudinal portion and a handle portion offset from a longitudinal axis of the longitudinal portion;

the longitudinal portion being telescopically disposed inside the longitudinal tube;

means for rotatably adjusting the rotatable tube relative to the longitudinal tube; and means for locking the rotatable tube relative to the longitudinal tube, so that the rotatable tube rotates with the longitudinal tube.

10. A roll-up flexible cover assembly according to claim 9, wherein the adjusting means includes an enlarged portion of the rotatable tube being disposed in an enlarged end portion of the longitudinal tube, the enlarged portion of the rotatable tube being freely rotated within the enlarged end portion of the longitudinal tube.

11. A roll-up flexible cover assembly according to claim 10, wherein the longitudinal tube further includes a reduced diameter end portion away from the enlarged end portion, the reduced diameter end portion having a smaller diameter than the enlarged portion of the rotatable tube, so that the rotatable tube extends to a longest length without falling out of the longitudinal tube.

12. A roll-up flexible cover assembly according to claim 9, wherein the locking means includes a multi-sided portion of the rotatable tube being disposed within a multi-sided body portion of the longitudinal tube, so that the rotatable tube is locked relative to the longitudinal tube.

13. A roll-up flexible cover assembly according to claim 12, wherein the adjusting means includes an enlarged end portion of the longitudinal tube, the multi-sided portion of the rotatable tube being freely rotated within the enlarged end portion, so that the rotatable tube is freely rotated relative to the longitudinal tube when the multi-sided portion of the rotatable tube is disposed within the enlarged end portion.

14. A roll-up flexible cover assembly according to claim 13, wherein the longitudinal tube further includes a reduced diameter end portion away from the enlarged end portion, the reduced diameter end portion having a smaller diameter than the enlarged portion of the rotatable tube, so that the rotatable tube extends to a longest length without falling out of the longitudinal tube.

15. A roll-up flexible cover assembly according to claim 14, wherein the enlarged and reduced diameter end portions are in a circular shape, the multi-sided portion of the rotatable tube and. the multi-sided body portion of the longitudinal tube are in a rectangular shape.

16. A roll-up flexible cover assembly according to claim 13, wherein the multi-sided portion of the rotatable tube and the multi-sided body portion of the longitudinal tube are four-sided, so that the rotatable tube is quarterly-turned with respect to the longitudinal tube.

17. A roll-up flexible cover assembly according to claim 1, wherein the rotating means is a crank handle, the crank handle comprises:

a longitudinal tube;

a rotatable tube having a longitudinal portion and a handle portion offset from a longitudinal axis of the longitudinal portion;

the longitudinal portion being telescopically disposed in the longitudinal tube;

means for locking the rotatable tube relative to the longitudinal tube, so that the rotatable tube rotates with the longitudinal tube; and the longitudinal tube including a stopping portion, the stopping portion stopping the rotatable tube from falling from the longitudinal tube.

18. A roll-up flexible cover assembly according to claim 17, wherein the crank handle includes an enlarged portion of the rotatable tube being disposable in an enlarged end portion of the longitudinal tube, the enlarged portion of the rotatable tube being freely rotated within the enlarged end portion of the longitudinal tube.

19. A roll-up flexible cover assembly according to claim 17, wherein the longitudinal portion of the rotatable tube and the longitudinal tube have a four-sided cross section, whereby the crank handle is rotatably adjustable in quarter turns at 90° increments.

20. A roll-up flexible cover assembly according to claim 17, wherein the locking means includes a multi-sided portion of the rotatable tube being disposed within a multi-sided body portion of the longitudinal tube, so that the rotatable tube is locked relative to the longitudinal tube.

21. A roll-up flexible cover assembly according to claim 20, wherein the longitudinal tube further includes an enlarged end portion, the multi-sided portion of the rotatable tube being rotated within the enlarged end portion, so that the rotatable tube is freely rotated relative to the longitudinal tube when the multi-sided portion of the rotatable tube is disposed within the enlarged end portion.

22. A roll-up flexible cover assembly according to claim 18, wherein the stopping portion is a reduced diameter end portion of the longitudinal tube away from the enlarged end portion, the reduced diameter end portion having a smaller diameter than the enlarged portion of the rotatable tube, so that the rotatable tube extends to a longest length without falling out of the longitudinal tube.

23. A roll-up flexible cover assembly according to claim 22, wherein the enlarged and reduced diameter end portions are in a circular shape, the multi-sided portion of the rotatable tube and the multi-sided body portion of the longitudinal tube are in a rectangular shape.

24. An open container, being covered or uncovered by a roll-up flexible cover assembly mounted thereon, comprising:

front and back walls, two side walls, and a bottom wall;

a roll tube transversely extending over the side walls adjacent a first end of the container, the roll tube being mounted on the side walls of the container;

a flexible cover being rolled about the roll tube, one end of the flexible cover being attached to the roll tube;

a cross bar transversely extending over the container, the other end of the flexible cover interconnecting with the cross bar;

a flexible arm being mounted on each end of cross bar, the flexible arms each having a pivot point mounted on the side walls of the container, each of the flexible arms being biasedly to keep constant tension on the flexible cover;

a pulley being disposed proximate an end of each flexible arm;

a spool being connected to each end of the roll tube;

a pair of cables, one end of each of the cables being attached to each of the spools, the other end of each of the cables being attached to tension means for adjusting the tension of each of the cables, each of the cables being looped around each of the pulleys;

each of the tension means being mounted on the side walls of the container; and rotating means, being interconnected to one end of the roll tube, for rotating the roll tube.

25. An open container in according to claim 24, the rotating means is a crank handle.

26. An open container according to claim 24, wherein the rotating means is a crank handle, the crank handle comprises:

a multi-sided longitudinal tube having an enlarged portion proximate at a first end;

a tubular rotatable tube having a longitudinal portion and a handle portion offset from a longitudinal axis of the longitudinal portion;

the longitudinal portion being telescopically disposed in the longitudinal tube and movable between the first end and a second end of the multi-sided longitudinal tube; and the tubular rotatable tube having a multi-sided enlarged portion at a first end corresponding to the multi-sided longitudinal tube, so that only when the multi-sided enlarged portion of the tubular rotatable tube is disposed in the enlarged portion of the multi-sided longitudinal tube, the tubular rotatable tube can be freely rotated in the multi-sided longitudinal tube, and when the multi-sided enlarged portion of the tubular rotatable tube is retracted from the enlarged portion of the multi-sided longitudinal tube, the multi-sided enlarged portion engages with multi sides of the longitudinal tube whereby the two tubes are transversely engaged with each other so that the two tubes are rotated together.

* * * * *